(12) United States Patent
Dighrasker et al.

(10) Patent No.: US 12,418,202 B2
(45) Date of Patent: Sep. 16, 2025

(54) MULTIPURPOSE ELECTRIC FIELD SHIELD FOR WIRELESS POWER TRANSFER SYSTEMS

(71) Applicant: Cypress Semiconductor Corporation, San Jose, CA (US)

(72) Inventors: Milind Dighrasker, Bangalore (IN); Hariom Agrawal, Mathura (IN); Satishbabu Bhogineni, Guntur (IN)

(73) Assignee: Cypress Semiconductor Corporation, San Jose, CA (US)

( * ) Notice: Subject to any disclaimer, the term of this patent is extended or adjusted under 35 U.S.C. 154(b) by 196 days.

(21) Appl. No.: 18/338,616

(22) Filed: Jun. 21, 2023

(65) Prior Publication Data

US 2024/0283299 A1    Aug. 22, 2024

Related U.S. Application Data

(60) Provisional application No. 63/446,457, filed on Feb. 17, 2023.

(51) Int. Cl.
*H02J 50/70* (2016.01)
*H02J 50/12* (2016.01)

(52) U.S. Cl.
CPC .............. *H02J 50/70* (2016.02); *H02J 50/12* (2016.02)

(58) Field of Classification Search
CPC .......... H02J 50/70; H02J 50/12; H02J 50/005; H02J 50/10
See application file for complete search history.

(56) References Cited

U.S. PATENT DOCUMENTS

| | | | |
|---|---|---|---|
| 9,230,732 B2 | 1/2016 | Muratov et al. | |
| 10,561,049 B2 | 2/2020 | Saab et al. | |
| 2012/0049991 A1* | 3/2012 | Baarman | H02J 50/005 336/199 |
| 2021/0152026 A1* | 5/2021 | Goodchild | H02J 50/10 |
| 2023/0369916 A1* | 11/2023 | Kim | H02J 50/402 |

\* cited by examiner

*Primary Examiner* — Daniel Cavallari

(57) ABSTRACT

A wireless power transfer system is disclosed. The system includes a wireless power transmitter including a transmitter coil and a transmitter electric field shield disposed over the transmitter coil. The transmitter electric field shield includes a first printed circuit board (PCB) and a second PCB. Each of the first and second PCBs includes a number of apertures. The apertures of the first PCB do not overlap with the apertures of the second PCB. The system further includes a wireless power receiver including a receiver coil and a receiver electric field shield disposed over or underneath the receiver coil. The receiver electric field shield includes a PCB having a first layer and a second layer connected to one another. The first layer of the PCB mates with the receiver coil and the second layer of the PCB mates with an interface surface of the wireless power receiver.

9 Claims, 6 Drawing Sheets

MULTIPURPOSE ELECTRIC FIELD SHIELD FOR WIRELESS POWER TRANSFER SYSTEMS

CROSS-REFERENCE TO RELATED APPLICATIONS

This application claims the benefit of U.S. Provisional Application No. 63/446,457 filed on Feb. 17, 2023, the disclosure of which is incorporated herein by reference.

TECHNICAL FIELD

This disclosure generally relates to wireless power transfer systems, and more specifically, to electric field shielding for wireless power transfer systems.

BACKGROUND

Wireless devices may be configured to utilize various wireless charging components to recharge batteries and other power storage devices. Accordingly, such wireless devices may have associated wireless power transfer systems (e.g., charging stations), and such devices and systems may have transmitters and receivers including, among other things, inductive elements configured for charging operations. Moreover, wireless devices and their associated wireless power transfer systems may be capable of multiple different charging modes.

A high power wireless power transfer system, which includes a transmitter and a receiver, generally has significant power loss contributed by transmitter and receiver coils. Thus, in a typical high power wireless power transfer system, a cooling fan is required for cooling the interface surface (i.e., mating surface of transmitter and receiver coils). For automotive applications, where the transmitter coil is enclosed, the cooling of the interface surface is imperative. Further, the high power wireless system also requires an electric field shield for the transmitter and receiver coils. The purpose of the shield is to shield the electric field and let pass of the magnetic field. The electric field shielding reduces the electromagnetic interference (EMI). The EMI requirements are more stringent for automotive applications and using a shield to meet the EMI requirements is unavoidable.

While conventional wireless power transfer systems address EMI issues by using shielding to reduce EMI, such shielding degrades thermal performance of the systems as shield covers the interface surface, thereby blocking air flow to transmitter and receiver coils.

In a typical wireless system, the transmitter generally includes a cooling fan to cool the interface surface and the receiver generally includes functions to allow the fan air to cool the receiver. Further, reliable foreign object detection (FOD) is generally a challenge particularly when foreign object (FO) resistance is placed in a corner of the interface surface so that it can escape the Q factor and power loss detection method but is large enough to cause heat.

DETAILED DESCRIPTION

Figure 1:
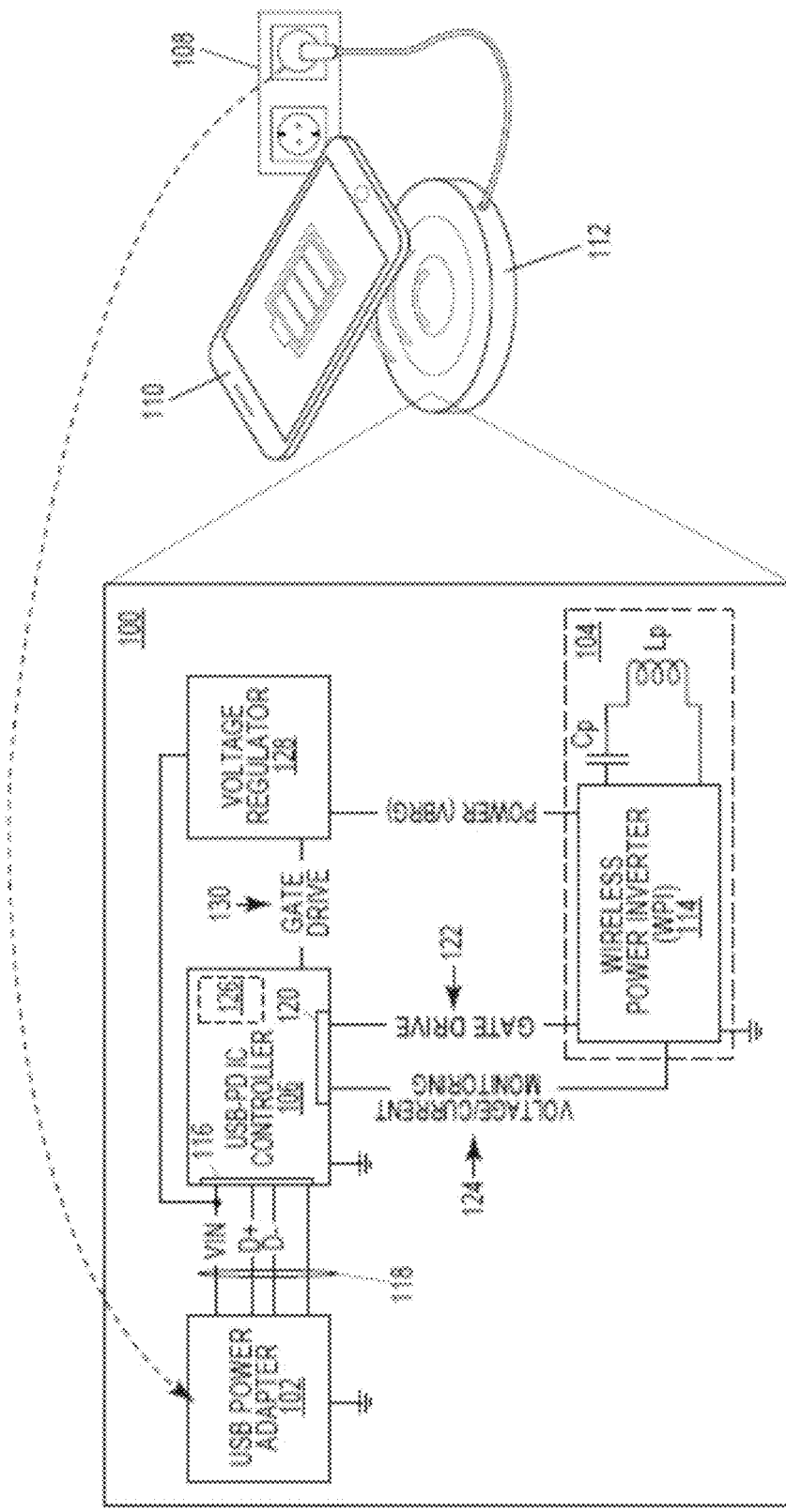
FIG. 1 is a diagram illustrating an example of a system for wireless charging in accordance with various embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Embodiments of the disclosure provide an interface surface design for optimally addressing the EMI and thermal aspects of the system design. The embodiments described herein may use a split shield approach for the transmitter system interface surface design, which also serves the purpose of air channel on the interface surface. The embodiments described herein also provide an effective shield to electric field to reduce the EMI while providing effective air flow from the cooling fan to both the transmitter and receiver coils. The embodiments described herein can be used for different arrangements of the coils, such as horizontal placement and vertical placement. The embodiments described herein further address both the design aspects for receiver system design also by using a thermally conductive electric field shield. The embodiments described herein provide an innovative method that reliably detects the FO by using an eddy current induced in the electric field shield patterns. The embodiments described herein provide an ease of manufacturing by providing a unified interface surface with integration of an electric field shield with thermal design, thereby eliminating the need of additional vents, befell for thermal aspects. Embodiments of the split shield described herein can be realized using a combination of any insulating and/or conductive materials, for example, plastic with conductive ink, flexible printed circuit board (PCB), etc. The embodiments described herein can be scaled and used for higher power (e.g., 15 W to <100 W) where EMI and thermal becomes even more important. The embodiments described herein can also be used for automotive applications where coils are encapsulated, and be used for different coil positions, such as horizontal and vertical/standing positions.

In one aspect, a wireless power transmitter is provided. The transmitter may include a transmitter coil and a transmitter electric field shield disposed over the transmitter coil. The transmitter electric field shield may include a first printed circuit board (PCB) and a second PCB. The first PCB may be disposed over the second PCB. Each of the first and second PCBs may include a number of apertures. In an embodiment, the apertures of the first PCB do not overlap with the apertures of the second PCB.

In another aspect, a wireless power receiver is provided. The receiver may include a receiver coil and a receiver electric field shield disposed over or underneath the receiver coil. The receiver electric field shield may include a PCB having a first layer and a second layer connected to one another. The first layer of the PCB may mate with the receiver coil and the second layer of the PCB may mate with an interface surface of the wireless power receiver.

In yet another aspect, a wireless power transfer system is provided. The system may include a wireless power transmitter including a transmitter coil and a transmitter electric field shield disposed over the transmitter coil. The transmitter electric field shield may include a first PCB and a second PCB. The first PCB may be disposed over the second PCB. Each of the first and second PCBs may include a number of apertures. The apertures of the first PCB do not overlap with the apertures of the second PCB. The system may further include a wireless power receiver including a receiver coil and a receiver electric field shield disposed over or underneath the receiver coil. The receiver electric field shield may include a PCB having a first layer and a second layer connected to one another. The first layer of the PCB may mate with the receiver coil and the second layer of the PCB may mate with an interface surface of the wireless power receiver.

FIG. 1 illustrates a diagram of an example of a system for wireless charging, configured in accordance with various embodiments. More specifically, a system, such as wireless charging system 100, may be configured to support different operational modes for charging operations. As will be discussed in greater detail below, various components of wireless charging system 100 may include control logic that may be configured to determine transmission parameters used for wireless charging, and to determine which operational mode should be used at what time. In some embodiments, such management of different operational modes is performed using a single pulse width modulator, thus allowing implementation of such operational mode control without additional synchronization logic.

In various embodiments, wireless charging system 100 includes Universal Serial Bus (USB) power adaptor 102, wireless charging station 104, and USB-Power Delivery (PD) integrated circuit (IC) controller 106 coupled to both USB power adaptor 102 and wireless charging station 104. USB power adaptor 102 interfaces with a power source such as AC mains and outputs a voltage 'VIN' based on the power source. In some embodiments, USB power adaptor 102 plugs into wall outlet 108. However, other AC or DC power source configurations are possible, such as for example a DC power source provided from a car battery. USB power adaptor 102 may be compliant with the USB-PD specification, USB-C specification, PPS (Programmable Power Supply) specification, etc. In general, the voltage VIN output by USB power adaptor 102 may have relatively small output voltage steps, e.g., every 10 mV, 40 mV, 100 mV, etc., or larger steps, e.g., 5V, 12V and 15V.

Wireless charging station 104 wirelessly charges wireless charging device 110 such as a cellular phone, smartphone, PDA (personal digital assistant), PDA phone, etc. in charging proximity of wireless charging station 104. Wireless charging station 104 may be integrated in charging pad 112 and may include Wireless Power Inverter (WPI) 114 for wirelessly transferring power via magnetic induction to charge a battery included in wireless charging device 110 placed on charging pad 112. WPI 114 may be a full-bridge or half-bridge inverter having voltage 'VBRG' as a DC input voltage, for example.

Wireless charging station 104 includes an induction coil Lp placed in a series resonant circuit with a capacitor Cp to yield a resonant circuit with a natural resonance when coupled to the corresponding coil (not shown) included in wireless charging device 110. When wireless charging device 110 is placed on charging pad 112, the proximity of the coils allows an electromagnetic field to be created. This electromagnetic field allows power to pass from the coil Lp in charging pad 112 to the coil in wireless charging device 110. The induction coil in wireless charging device 110 uses the transferred power to charge the device battery. More than one coil may be used on the transmit and receive sides.

The same USB-PD IC controller 106 is used to control both wireless charging station 104 and USB power adaptor 102. USB-PD IC controller 106 includes first USB port 116 for coupling USB-PD IC controller 106 to USB power adaptor 102 over USB cable 118. USB-PD IC controller 106 may control USB power adaptor 102 via D+ and D− data pins on USB power adaptor 102.

USB-PD IC controller 106 also includes second port 120 for coupling the USBPD IC controller 106 to wireless charging station 104. USB-PD IC controller 106 may control wireless charging station 104 via gate drive signal 122 provided to WPI 114 of wireless charging station 104. For example, gate drive signal 122 may be a PWM (pulse width modulation) signal provided to a gate driver of WPI 114 for controlling the gates of power transistors that form full-bridge or half-bridge inverter of WPI 114. USB-PD IC controller 106 may control wireless charging station 104 based on voltage and/or current information 124 received from wireless charging station 104.

USB-PD IC controller 106 also includes logic 126 for controlling the level of the voltage VIN output by USB power adaptor 102 and the output power level of wireless charging station 104. The input voltage 'VBRG' of wireless charging station 104 corresponds to the voltage VIN output by USB power adaptor 102 or is derived from the voltage VIN output by USB power adaptor 102. As explained above, the USB power adaptor output voltage VIN may have relatively small voltage steps, e.g., every 10 mV, 40 mV, 100 mV, etc.

If the degree of voltage control available at USB power adaptor 102 is sufficient to implement the full output power range of wireless charging station 104, the USB power adaptor output voltage VIN may be input directly as the wireless charging station input voltage VBRG and USB-PD IC controller 106 may control the output power level of wireless charging station 104 by changing the level of VIN and/or the operating frequency or duty cycle of wireless charging station 104. If more granular voltage level control is needed to implement the full output power range of wireless charging station 104, wireless charging system 100 may also include voltage regulator 128 such as a DC/DC switching regulator such as a buck regulator or other type of step-down converter for regulating the input voltage VBRG of wireless charging station 104 based on the voltage VIN output by USB power adaptor 102. In this case, USB-PD IC controller 106 also controls voltage regulator 128, e.g., via gate drive signal 130 such as a PWM signal for controlling power transistors of voltage regulator 128.

Figure 2:
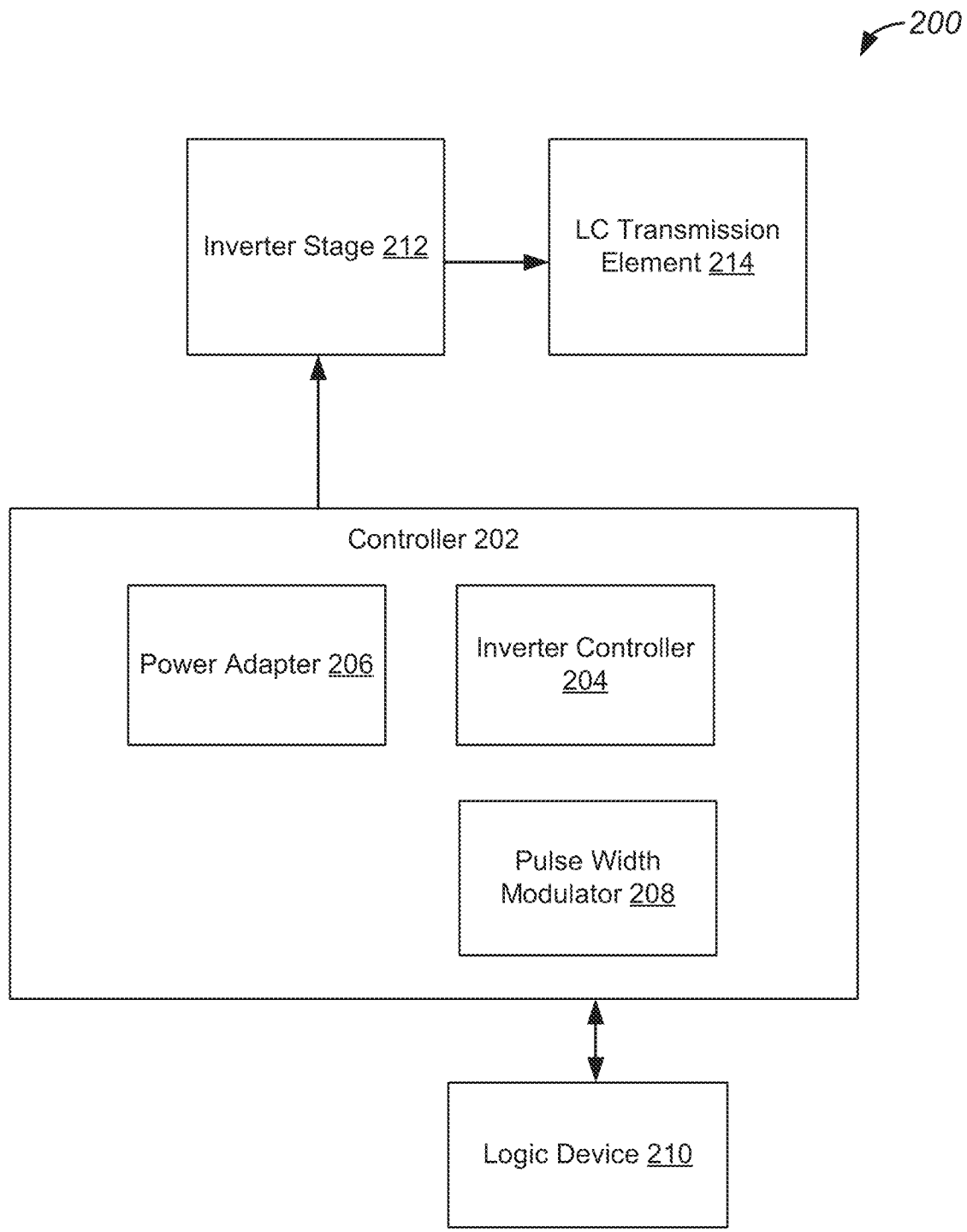
FIG. 2 is a block diagram illustrating another example of a system for wireless charging in accordance with various embodiments.

FIG. 2 illustrates a diagram of another example of a system for wireless charging, configured in accordance with various embodiments. As similarly discussed above, a system, such as wireless charging system 200, may be configured to support different operational modes for charging operations. Various components of wireless charging system 200 may include control logic that may be configured to determine transmission parameters used for wireless charging, and to determine which operational mode should be used at what time As similarly discussed above, system 200 may include a controller, such as controller 202, which is configured to control operation of various components within system 200. More specifically, controller 202 may include components such as inverter controller 204 and pulse width modulator 208. As similarly discussed above, inverter controller 204 may be configured to control operation of an inverter stage of a power inverter, such as inverter stage 212. As will be discussed in greater detail below, inverter controller 204 may be configured to control input signals, such as input currents, provided to transistors included in inverter stage 212. Accordingly, inverter controller 204 may be configured to control the operation of one or more transistors included within inverter stage 212. In some embodiments, inverter stage 212 includes transistors configured as a half-bridge inverter. In various embodiments, inverter stage 212 includes transistors configured as a full-bridge inverter. As shown in FIG. 2, inverter stage 212 may be coupled to a transmission element, such as LC transmission element 214, which is configured to transmit an output signal for wireless charging.

System 200 further includes pulse width modulator 208 which is configured to generate a control signal used to drive power transfer operations. Accordingly, a control signal generated by pulse width modulator 208 may have a designated frequency, amplitude, and duty cycle. Thus, pulse width modulator 208 may be configured to generate a control signal that is ultimately used to drive other system components, such as inverter stage 212 and LC transmission element 214. In various embodiments, one or more other components, such as logic device 210, may generate additional signals based on an output of pulse width modulator 208, and such additional signals may also be used for these purposes.

System 200 additionally includes logic device 210 which is configured to receive a signal from pulse width modulator 208, and generate one or more output signals based on the received signal. Logic device 210 is configured to generate multiple output signals based on a single signal received from a single pulse width modulator. Accordingly, multiple outputs may be generated by logic device 210, and may be provided to components of controller 202, such as inverter controller 204 to control components of inverter stage 212, such as one or more transistors.

System 200 may also include power adapter 206 which is configured to receive power from a power source. Accordingly, power adapter 206 may include a power sink and low-dropout (LDO) regulator configured to receive power via a cable, such as a USB cable, and provide power to other components of controller 202.

Figure 3A:
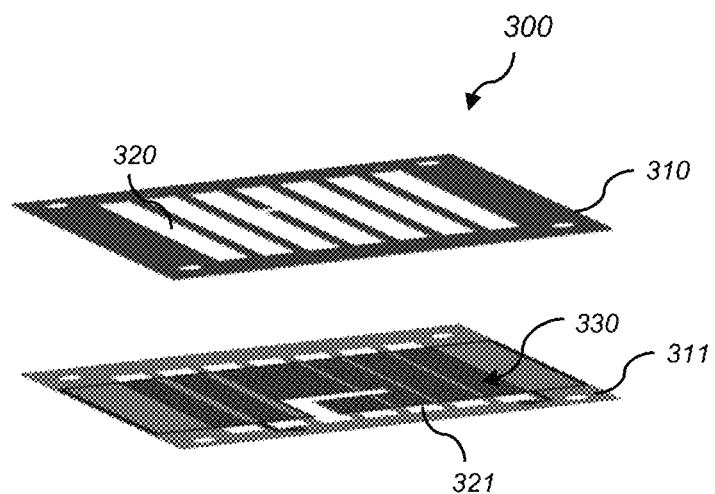
FIGS. 3A-3B are diagrams illustrating an example of a transmitter electric field shield in accordance with various embodiments.
Figure 3B:
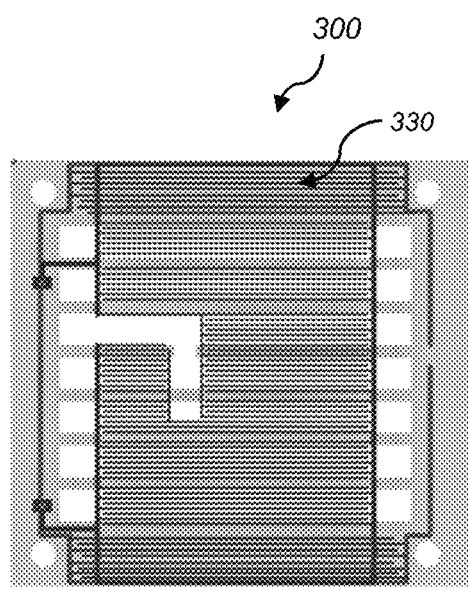

FIGS. 3A-3B are diagrams illustrating an example of a transmitter electric field shield in accordance with various embodiments. In some embodiments, the transmitter electric field shield may be integrated in wireless charging station 104 of FIG. 1 or wireless charging system 200 of FIG. 2. Referring to FIG. 3A, transmitter electric field shield 300 uses a split shield approach for an interface surface of a wireless power transmitter to shield electric field generated by the transmitter while allowing magnetic field to pass. As shown, shield 300 may be split between a first PCB 310 and a second PCB 311. In addition to the shielding, each of the PCBs 310-311 also includes a number of apertures (or cut outs), for example apertures 320 and apertures 321 respectively, for cooling air to pass through. In this embodiment, the respective apertures 320-321 on both PCBs 310-311 are not overlapping. In an embodiment, PCB 310 and PCB 311 are disposed over one another, over a transmitter coil of the transmitter (not shown) to realize the interface surface of the wireless power transmitting system. In an embodiment, PCB 310 and PCB 311 may be in contact with one another, though in another embodiment, there may be a space in between them.

With continued reference to FIG. 3A, PCB 311 may include traces 330 made of an electrically conductive material (e.g., copper traces). Traces 330 may be formed with specific patterns (e.g., open ended patterns) to produce an effective electric field shield. Referring now to FIG. 3B, the PCBs 310-311, which may be disposed or formed at an interface surface of the transmitter, are assembled forming shield 300. The interface surface formed with the assembled PCBs provides an uninterrupted electric field shielding for shield 300 as the apertures 320-321 on the assembled PCBs 310-311 are not overlapping. At the same time, the apertures 320-321 are configured such that when both PCBs 310-311 are disposed over one another, they may provide an inlet path for air to flow to the interface surface, thereby creating a channel for air to flow over the interface surface and exit path. Accordingly, shield 300 addresses both cooling of the interface surface and reduction of EMI.

Figure 4:
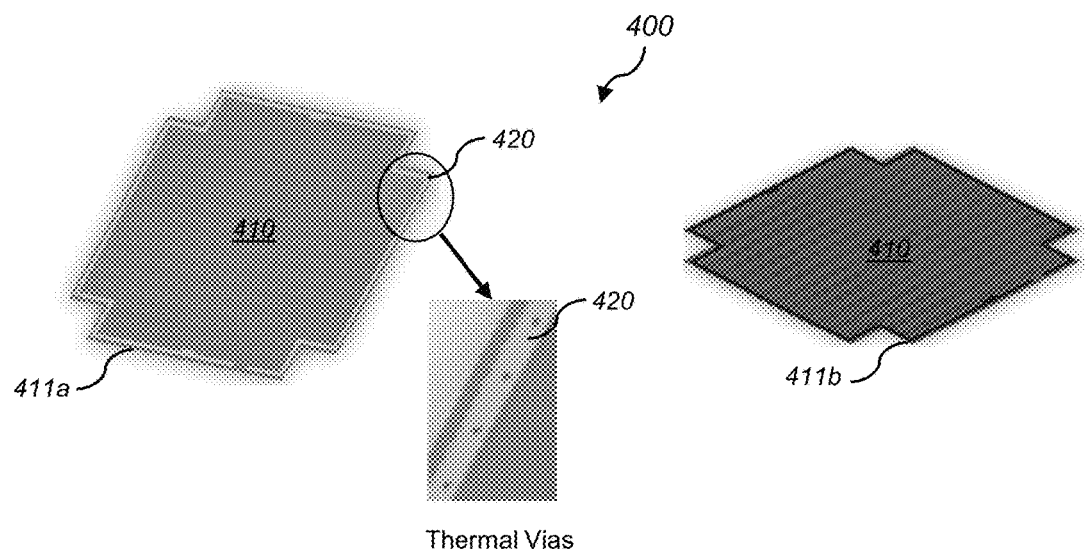
FIG. 4 is a diagram illustrating an example of a receiver electric field shield in accordance with various embodiments.

FIG. 4 is a diagram illustrating an example of a receiver electric field shield in accordance with various embodiments. In some embodiments, the receiver electric field shield may be integrated or implemented in wireless charging device 110 of FIG. 1, such as a cellular phone, smartphone, PDA (personal digital assistant), PDA phone, etc. Referring to FIG. 4, receiver electric field shield 400 uses a split shield approach for an interface surface of a wireless power receiver to shield electric field generated by the receiver while allowing magnetic field to pass. In system 400, shield 400 may be split between a first layer 411a and a second layer 411b of a same PCB 410. In an embodiment, parts or an entirety of the PCB 410 in layer 411a may be connected to parts or an entirety of layer 411b through thermal vias 420 to ensure effective thermal conductivity between both layers/sides 411a-b of PCB 410. When the shielded PCB 410 is implemented with a receiver coil of the receiver (not shown), one of the PCB layer/side (e.g., layer 411a/411b) may mate with the receiver coil and another PCB layer/side (e.g., layer 411a/411b) may mate with the interface surface. The PCB 410 may be disposed over or underneath the receiver coil. In an embodiment, the PCB layer/side facing the interface surface may come in contact with the transmitter surface air channel. Since both PCB layers 411a-b have good thermal conductivity, the cooling is effective for other side of the PCB layer/side which in turn cools the receiver coil. Also, the shield on both layers 411a-b may block the electric field to reduce EMI. For example, one or both of the layers 411a-b may include traces (e.g., traces 330 of FIG. 3 or other suitable traces) served to block the electric field produced by the receiver coil.

Figure 5:
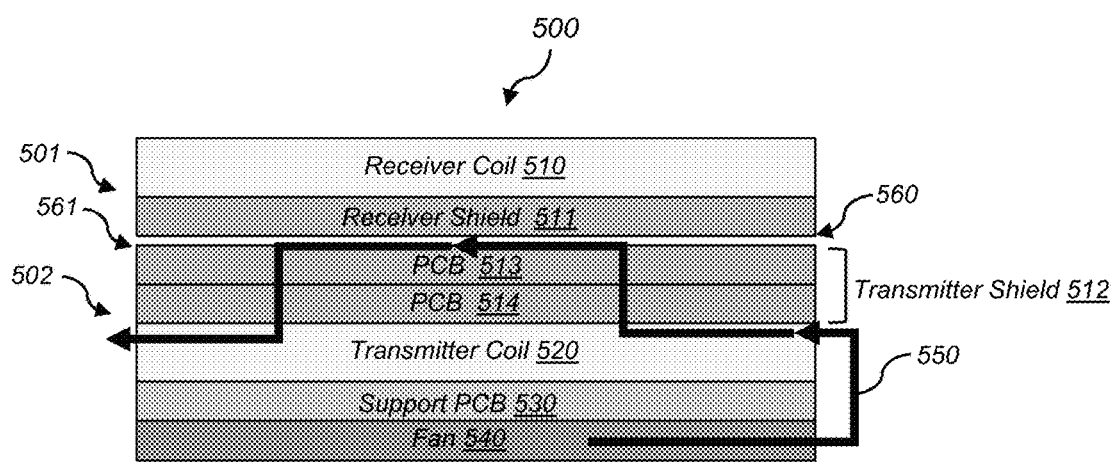
FIG. 5 is a diagram illustrating a sectional view of an electric field shielding system for interface surface cooling and shielding in accordance with various embodiments.

FIG. 5 is a diagram illustrating an example of an electric field shielding system for interface surface cooling and shielding in accordance with various embodiments. Referring to FIG. 5, electric field shielding system 500 includes, but not limited to, a wireless power receiver 501 and a wireless power transmitter 502. As shown, wireless power receiver 501 includes, but not limited to, a receiver coil 510 and a receiver electric field shield 511. The receiver electric field shield 511 may be disposed over or underneath the receiver coil 510 to shield or block the electric field produced by the receiver coil 510, thereby effectively reducing EMI. As previously described, shield 511 may be formed with a PCB (e.g., PCB 410 of FIG. 4) having a first layer/side and a second layer/side connected to one another through thermal vias for good thermal conductivity. In an embodiment, the first layer of the PCB may mate with (or be connected to) the receiver coil 510. The second layer of the PCB may mate with (or be connected to) an interface surface 560 of the wireless power receiver 501.

Figure 8A:
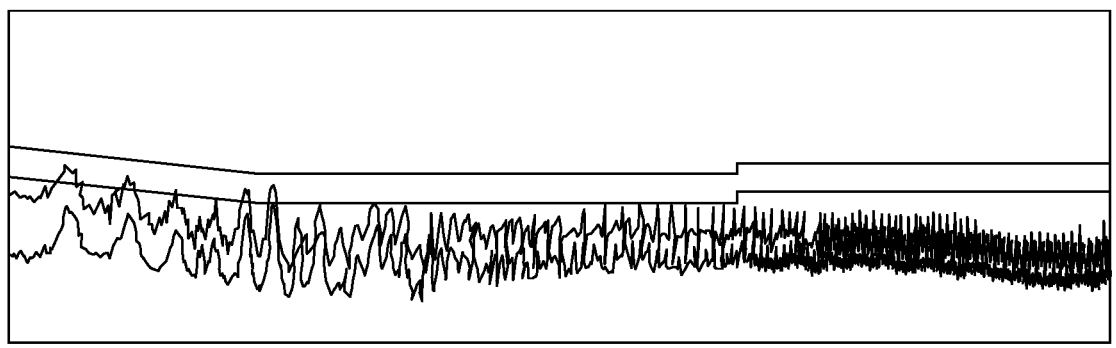
FIGS. 8A-8B are graphs showing a comparison of EMI results of a conventional EMI shielding system and the electric field shielding system in accordance with various embodiment herein.
Figure 8B:
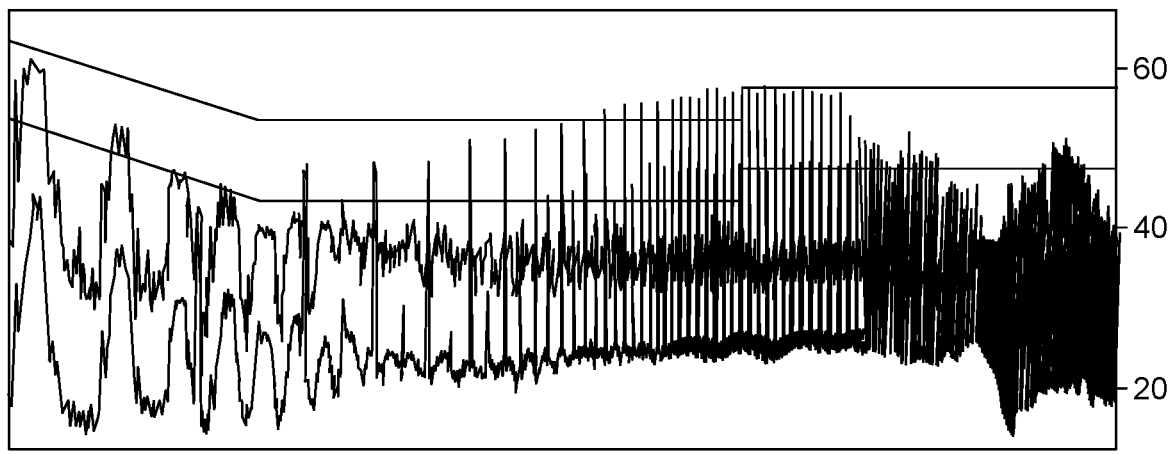

With continued reference to FIG. 5, wireless power transmitter 502 includes, but not limited to, a transmitter electric field shield 512 and a transmitter coil 520. The transmitter electric field shield 512 may be disposed over the transmitter coil 520. As shown, shield 512 may include a first PCB 513 and a second PCB 514, with the PCB 513 being disposed over the PCB 514. In an embodiment, PCBs 513-514 may be in contact with one another, though in another embodiment, there may be a space or gap in between them. In an embodiment, each of the PCBs 513-514 may include apertures (not shown) for cooling air (e.g., cooling air generated by fan 540) to pass through. The apertures of PCBs 513-514 may be non-overlapping with one another when the PCBs 513-514 are assembled. Although not shown, PCB 514 may include traces made of an electrically conductive material, such as copper traces. As discussed in more detail herein below, the traces may be formed with specific patterns (e.g., open ended patterns) to produce an electric field shield. In an embodiment, shield 512 is placed over the transmitter coil 520 at the interface surface 561 of the wireless power transmitter 502 to shield the electric field produced by the transmitter coil 520 while allowing the magnetic field to pass. This therefore effectively reduces EMI, as shown in FIGS. 8A-8B.

Still referring to FIG. 5, system 500 may further include a support PCB 530 disposed underneath the transmitter coil 520. Support PCB 530 may be seen as a "dummy" PCB that provides support for the transmitter coil 520. In an embodiment, system 500 may also include a fan 540. Fan 540 may generate cooling air through air channel 550 to cool the wireless power receiver 501 and the wireless power transmitter 502. For example, air channel 550 may extend from fan 540, through an inlet path of the transmitter coil 520 and the apertures of PCBs 513-514, over the interface surface 561, and to an exit path of the transmitter coil 520. Furthermore, since the PCB layer/side of the receiver shield 511 that faces the interface surface 560 may come in contact with the air channel 550 at interface surface 561 and both PCB layers of receiver shield 511 have good thermal conductivity, the cooling enabled by the air channel 550 is effectively passed to the other PCB layer/side of the receiver shield 511, which in turn cools the receiver coil 510. Therefore, system 500 addresses both cooling of the receiver 501 and transmitter 502, and reduction of EMI produced by coils 510 and 520.

Figure 6:
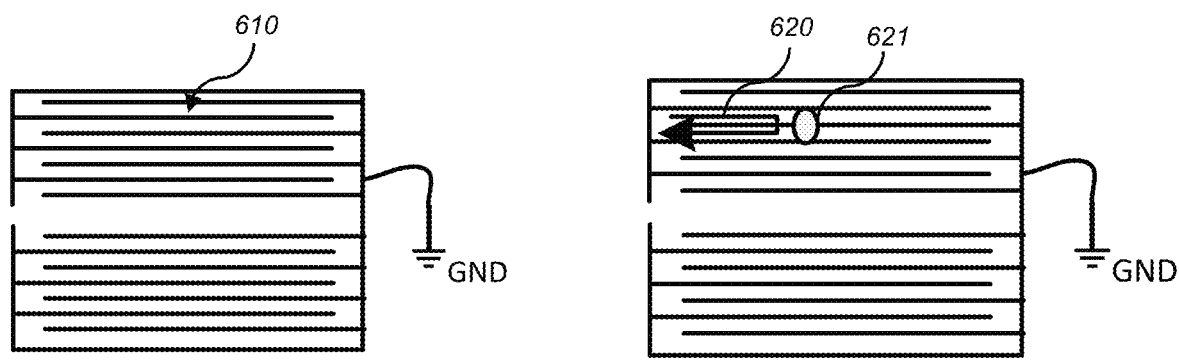
FIG. 6 is a diagram illustrating an example of traces of a PCB in accordance with various embodiments.

FIG. 6 is a diagram illustrating an example of traces of a PCB in accordance with various embodiments. In some embodiments, traces 610 may be implemented on PCB 311 of FIG. 3A or PCB 514 of FIG. 5. Referring to FIG. 6, an interface surface (of a transmitter or receiver) may include traces 610 to form an electric field shield. The traces 610 may be formed using an electrically conductive material (e.g., copper traces). Traces 610 may have open-ended patterns which does not result in significant eddy currents. For example, when a foreign object 621 is placed on the interface surface, it may short a pair of adjacent traces and form an eddy current loop (e.g., eddy current loop 620). In some embodiments, the eddy current loop 620 reduces the resistivity of the circuit and brings down the Q factor measured by the transmitter. Also, while the wireless power transfer system is in power delivery, the eddy current loop 620 may increase the system power loss.

In a normal/conventional interface surface, presence of a foreign object may reduce the Q factor or increase the power loss of the system, but the change in those parameters may depend on the size/resistivity of the foreign object, and also the placement of the foreign object on the interface surface. In some operational contexts, there is a possibility that Q factor method or power loss method of FOD may not detect the foreign object, and thus, it can heat the system due to self-heating. However, in accordance with the techniques described herein, using the traces 610 as shown in FIG. 6, can help bring additional eddy current loss, thereby reducing the Q factor or increasing power loss significantly to make the foreign object detection reliable even when the foreign object is present at an undetected location, such as a corner of interface surface. It should be noted that the traces 610 illustrated in FIG. 6 are merely an example and other trace patterns may be utilized to achieve the same purpose.

Figure 7:
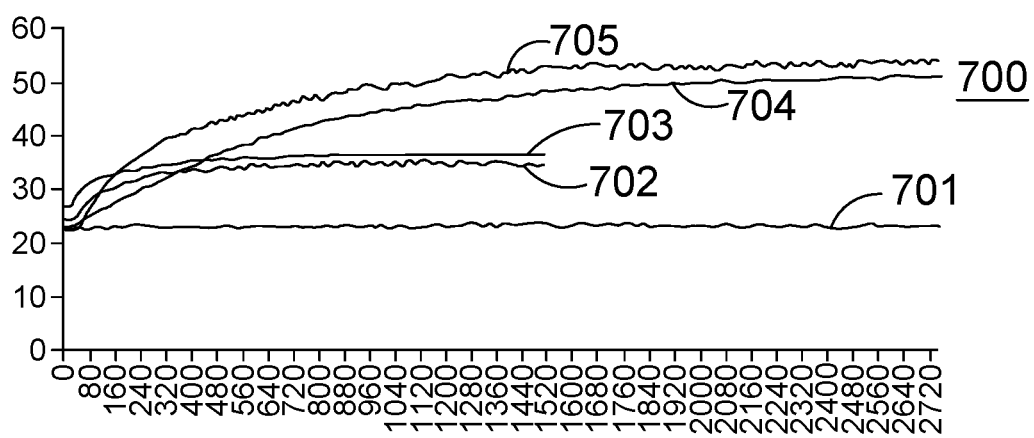
FIG. 7 is a graph showing a comparison of thermal test data of the electric field shielding system in accordance with various embodiment herein and a conventional EMI shielding system.

FIG. 7 is a graph showing a comparison of thermal test data of the electric field shielding system and a conventional EMI shielding system, in accordance with some embodiments herein. Referring to FIG. 7, in graph 700, temperature 702 of a receiver coil assembled with the receiver electric field shield according to the embodiments herein, temperature 703 of a transmitter coil assembled with the transmitter electric field shield according to the embodiments herein, temperature 704 of a transmitter coil implemented with a conventional EMI shield, and temperature 705 of a receiver coil implemented with a conventional EMI shield are shown relative to ambient temperature 701. As shown, the temperature 702 of the receiver coil assembled with the receiver electric field shield described herein is significantly lower than the temperature 705 of the receiver coil implemented with the conventional EMI shield. Correspondingly, the temperature 703 of the transmitter coil assembled with the transmitter electric field shield described herein is significantly lower than the temperature 704 of the transmitter coil implemented with the conventional EMI shield. Therefore, the receiver and transmitter electric field shields described herein are much more effective in cooling the receiver and transmitter coils than the conventional EMI shields.

FIGS. 8A-8B are graphs showing a comparison of EMI results of a conventional EMI shielding system and the electric field shielding system described herein. As illustrated in FIGS. 8A-8B, the EMI reduction of a wireless power transfer system having the receiver and transmitter electric field shields described herein (FIG. 8A) is significantly greater than the EMI reduction of a wireless power transfer system having conventional EMI shields (FIG. 8B). Therefore, the receiver and transmitter electric field shields described herein are also much more effective in reducing EMI as compared to the conventional EMI shields.

In the foregoing specification, embodiments of the disclosure have been described with reference to specific example embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A wireless power transfer system, comprising:
a wireless power transmitter comprising a transmitter coil and a transmitter electric field shield disposed over the transmitter coil, the transmitter electric field shield comprising a first printed circuit board (PCB) and a second PCB, wherein the first PCB is disposed over the second PCB with a space therebetween, each of the first and second PCBs includes a plurality of apertures, and the apertures of the first PCB do not overlap with the apertures of the second PCB; and
a wireless power receiver comprising a receiver coil and a receiver electric field shield disposed underneath the receiver coil, the receiver electric field shield comprising a PCB having a first layer and a second layer connected to one another, wherein the first layer of the PCB mates with the receiver coil and the second layer of the PCB mates with an interface surface of the wireless power receiver.

2. The wireless power transfer system of claim 1, wherein the second PCB of the transmitter electric field shield further includes a plurality of traces to block electric field generated by the transmitter coil and allow magnetic field generated by the transmitter coil to pass.

3. The wireless power transfer system of claim 2, wherein the traces have open-ended patterns.

4. The wireless power transfer system of claim 2, wherein the traces are made of an electrically conductive material.

5. The wireless power transfer system of claim 1, wherein the first layer of the PCB is connected to the second layer of the PCB through thermal vias.

6. The wireless power transfer system of claim 2, further comprising a fan configured to generate cooling air that passes through an air channel, wherein the air channel extends through an inlet path of the transmitter coil, the apertures of the first PCB and the apertures of the second PCB, over an interface surface of the wireless power transmitter, and to an exit path of the transmitter coil.

7. The wireless power transfer system of claim 6, wherein the interface surface of the wireless power receiver is in contact with the air channel to cool the receiver coil through thermal conductivity between the first layer of the PCB and the second layer of the PCB.

8. The wireless power transfer system of claim 1, wherein the transmitter electric field shield is disposed at an interface surface of the wireless power transmitter.

9. The wireless power transfer system of claim 1, wherein the receiver electric field shield is disposed at the interface surface of the wireless power receiver.

* * * * *